United States Patent
Ichino et al.

(10) Patent No.: US 9,975,158 B2
(45) Date of Patent: May 22, 2018

(54) ROLL SURFACE LAYER MATERIAL FOR HOT ROLLING WITH EXCELLENT FATIGUE RESISTANCE PRODUCED BY CENTRIFUGAL CASTING, AND COMPOSITE ROLL FOR HOT ROLLING PRODUCED THROUGH CENTRIFUGAL CASTING

(71) Applicant: JFE Steel Corporation, Tokyo (JP)

(72) Inventors: Kenji Ichino, Tokyo (JP); Tetsuo Mochida, Tokyo (JP); Hiromitsu Shibata, Tokyo (JP)

(73) Assignee: JFE Steel Corporation, Tokyo (JP)

(*) Notice: Subject to any disclaimer, the term of this patent is extended or adjusted under 35 U.S.C. 154(b) by 498 days.

(21) Appl. No.: 14/352,441

(22) PCT Filed: Oct. 15, 2012

(86) PCT No.: PCT/JP2012/006581
§ 371 (c)(1),
(2) Date: Apr. 17, 2014

(87) PCT Pub. No.: WO2013/057914
PCT Pub. Date: Apr. 25, 2013

(65) Prior Publication Data
US 2014/0287898 A1  Sep. 25, 2014

(30) Foreign Application Priority Data

Oct. 19, 2011  (JP) .................................. 2011-229398
Feb. 20, 2012  (JP) .................................. 2012-033506

(51) Int. Cl.
*B21B 27/00*  (2006.01)
*B21B 27/02*  (2006.01)
(Continued)

(52) U.S. Cl.
CPC .............. *B21B 27/00* (2013.01); *B21B 27/02* (2013.01); *B21B 27/032* (2013.01); *B22D 13/02* (2013.01);
(Continued)

(58) Field of Classification Search
CPC ........... B21B 27/00; B21B 27/02; B21B 1/26; B21B 27/032; B22F 3/15; B22F 3/24;
(Continued)

(56) References Cited

U.S. PATENT DOCUMENTS 5,225,007 A * 7/1993 Hattori .................... B21B 27/00
148/324
5,316,596 A * 5/1994 Kataoka .................. B21B 27/00
148/321
(Continued)

FOREIGN PATENT DOCUMENTS

CN  1846887  10/2006
CN  1861827  11/2006
(Continued)

OTHER PUBLICATIONS

English Machine Translation of JP2010275595A, Dec. 9, 2010.*
(Continued)

*Primary Examiner* — Sarang Afzali
(74) *Attorney, Agent, or Firm* — RatnerPrestia

(57) ABSTRACT

There is provided a roll surface layer material including a roll surface layer with excellent fatigue resistance. The roll surface layer material has a composition including, on a mass % basis, C: 2.3% to 2.9%, Si: 0.2% to 0.8%, Mn: 0.2% to 1.0%, Cr: 5.0% to 7.5%, Mo: 4.4% to 6.5%, V: 5.3% to 7.0%, Nb: 0.6% to 1.5%, and Co: 0.1% to 4.0% so as to satisfy $14.0 \leq (Mo+1.7V) \leq 17.0$ (where Mo represents a content (mass %) of Mo and V represents a content (mass %) of V) and further including Al: 0.001% to 0.03% and/or REM:
(Continued)

0.001% to 0.03%, wherein a carbide is contained at an area fraction of 13% to 40%. A composite roll obtained by integrally welding a shaft member to the roll surface layer member is treated as a centrifugal cast roll that includes a surface layer with excellent fatigue resistance.

2 Claims, 2 Drawing Sheets

(51) Int. Cl.
  B22D 13/02    (2006.01)
  C22C 37/00    (2006.01)
  B21B 27/03    (2006.01)
  B32B 15/01    (2006.01)
  C22C 37/06    (2006.01)
  C22C 37/10    (2006.01)
  C21D 9/38     (2006.01)
  C21D 1/25     (2006.01)

(52) U.S. Cl.
  CPC .............. *B32B 15/011* (2013.01); *C21D 1/25* (2013.01); *C21D 9/38* (2013.01); *C22C 37/00* (2013.01); *C22C 37/06* (2013.01); *C22C 37/10* (2013.01); *Y10T 29/49544* (2015.01)

(58) Field of Classification Search
  CPC ......... B22D 13/02; B32B 15/011; C21D 1/25; C21D 9/38; C22C 37/06; C22C 37/10; C22C 38/30; C22C 38/26; C22C 38/22; C22C 38/24; C22C 33/0278; C22C 37/00; Y10T 29/49544
  See application file for complete search history.

(56) References Cited

U.S. PATENT DOCUMENTS 5,601,667 A * 2/1997 Takahashi ................ C21D 7/13
                                                     148/649

6,095,957 A * 8/2000 Ichino ..................... B21B 27/00
                                                     492/54

FOREIGN PATENT DOCUMENTS

| | | |
|---|---|---|
| EP | 0430241 | 6/1991 |
| EP | 0464780 | 1/1992 |
| EP | 0559899 | 9/1993 |
| EP | 0698670 | 2/1996 |
| JP | 04-365836 | 12/1992 |
| JP | 05-1350 | 1/1993 |
| JP | 05132735 | 5/1993 |
| JP | 08325673 | 12/1996 |
| JP | 11-229069 | 8/1999 |
| JP | 2001-150007 | 6/2001 |
| JP | 2002-331344 | 11/2002 |
| JP | 2004255457 | 9/2004 |
| JP | 2005-232519 | 9/2005 |
| JP | 2006075892 | 3/2006 |
| JP | 2009-221573 | 10/2009 |
| JP | 2010-275595 | 12/2010 |

OTHER PUBLICATIONS

English Machine Translation of CN1861827A, Nov. 15, 2006.*
English machine Translation of KR1992-0002251, Yong-Sik Jang et al., published Feb. 28, 1992.*
International Search Report corresponding to application No. PCT/JP2012/006581, dated Dec. 18, 2012.
Extended European Search Report dated Mar. 27, 2015 in European Application No. 12842076.7.
Chinese Office Action dated Feb. 22, 2016 for Chinese Application No. 201280051440.9.
Korean Office Action for Korean Application No. 2014-7012906, dated Jul. 12, 2016, including Concise Statement of Relevance of Office Action, 10 pages.

* cited by examiner

ROLL SURFACE LAYER MATERIAL FOR HOT ROLLING WITH EXCELLENT FATIGUE RESISTANCE PRODUCED BY CENTRIFUGAL CASTING, AND COMPOSITE ROLL FOR HOT ROLLING PRODUCED THROUGH CENTRIFUGAL CASTING

CROSS REFERENCE TO RELATED APPLICATIONS

This application is the U.S. National Phase Application of PCT International Application No. PCT/JP2012/006581, which claims priority to Japanese Patent Application No. 2011-229398, filed Oct. 19, 2011, and Japanese Patent Application No. 2012-033506, filed Feb. 20, 2012, the contents of each of these applications being incorporated by reference herein in their entireties for all purposes.

FIELD OF THE INVENTION

The present invention relates to a hot rolling mill roll, and particularly to a centrifugal cast roll suitable for a hot finish rolling mill for steel sheets.

BACKGROUND OF THE INVENTION

In recent years, a technique for hot rolling steel sheets has significantly progressed. With this progress, the use environment of hot rolling mill rolls has further become severe. In particular, the production of steel sheets with a large hot rolling load, such as high strength steel sheets and thin-walled products has been increasing recently. Therefore, the improvement in the characteristics of hot rolling mill rolls used, in particular, the improvement in wear resistance has been strongly demanded. To satisfy the demand for improving wear resistance, high-speed steel rolls whose wear resistance has been considerably improved by forming a surface layer having a composition similar to that of high-speed tool steel and dispersing a large amount of hard carbide have been developed and widely used.

Such a high-speed steel roll surface layer material is described in, for example, Patent Literatures 1 and 2. The roll surface layer material described in Patent Literature 1 contains, on a mass % basis, C: 1.5% to 3.5%, Si: 1.5% or less, Mn: 1.2% or less, Ni: 5.5% or less, Cr: 5.5% to 12.0%, Mo: 2.0% to 8.0%, V: 3.0% to 10.0%, and Nb: 0.5% to 7.0%, and Nb and V are contained such that the contents of Nb, V, and C satisfy a particular relationship and the ratio of Nb and V is within a particular range. Thus, even if centrifugal casting is employed, the segregation in the surface layer material is suppressed. This provides excellent wear resistance and crack resistance to a roll surface layer material for a rolling mill.

The roll surface layer material described in Patent Literature 2 contains, on a mass % basis, C: 1.5% to 3.5%, Si: 1.5% or less, Mn: 1.2% or less, Cr: 5.5% to 12.0%, Mo: 2.0% to 8.0%, V: 3.0% to 10.0%, and Nb: 0.5% to 7.0%, and Nb and V are contained such that the contents of Nb, V, and C satisfy a particular relationship and the ratio of Nb and V is within a particular range. Thus, even if centrifugal casting is employed, the segregation in the roll surface layer material is suppressed. This improves the wear resistance and crack resistance, which significantly contributes to an improvement in the productivity in hot rolling.

A roll surface layer material including a roll surface layer with excellent fatigue resistance is described in Patent Literature 3. The roll surface layer material described in Patent Literature 3 contains, on a mass % basis, C: 2.2% to 2.6%, Si: 0.2% to 0.7%, Mn: 0.2% to 0.7%, Cr: 5.0% to 8.0%, Mo: 4.4% to 6.0%, V: 5.3% to 7.0%, and Nb: 0.6% to 1.3%, and the contents of Mo, V, C, and Nb are adjusted such that Mo+V and C−0.24V−0.13Nb are each within a particular range. This can considerably improve the fatigue resistance and suppress the damage to a roll surface. Thus, the lifetime of a roll can be lengthened and the surface quality of rolled products can be considerably improved.

PATENT LITERATURE

PTL 1: Japanese Unexamined Patent Application Publication No. 04-365836, which is incorporated by reference.
PTL 2: Japanese Unexamined Patent Application Publication No. 05-1350, which is incorporated by reference.
PTL 3: Japanese Unexamined Patent Application Publication No. 2009-221573, which is incorporated by reference.

SUMMARY OF THE INVENTION

However, a thinner wall, higher strength, and higher quality have been required for recent hot rolled steel sheets (rolled products), which considerably increases the hot rolling load. The hot rolling conditions such as an increase in the amount of continuous rolling with the improvement in productivity have become more severe and the use environment of hot rolling mill rolls has become increasingly severe.

When a slab to be rolled is hot rolled, a friction stress exerted in a roll rolling direction and a rolling motion stress exerted in a roll axis direction repeatedly act on the surface of a hot rolling mill work roll. Furthermore, a repeated rolling motion stress from a back up roll acts on the surface of the hot rolling mill work roll. As a result of the severe use environment of rolls described above, even if the roll surface layer materials described in Patent Literatures 1 and 2 are used, the work roll surface layer becomes fatigued due to such repeated loads caused by heat and stress. This poses a significant problem of fatigue damage such as the surface deterioration of a roll rolling surface, fatigue cracks, or surface chipping.

Even if the roll surface layer material described in Patent Literature 3 is used, surface chipping, fatigue cracks, and the like are sometimes caused.

The present invention aims to provide a roll surface layer material made by centrifugal casting for a hot rolling mill and a centrifugal cast roll for a hot rolling mill that advantageously solve the problems of the related art, can suppress the fatigue damage such as chipping or fatigue cracks, and have excellent fatigue resistance.

The inventors of the present invention have conducted thorough studies on various factors that affect the generation of the surface chipping and fatigue cracks of a centrifugal cast roll. As a result, it has been found that the chipping and fatigue cracks of a roll surface layer are caused by the superposition of an increase in hot rolling fatigue and a repeated load of excessive bearing stress (compressive stress) from a backup roll, which results from the severe use environment of a roll. Note that the hot rolling fatigue is caused by repeated heat transfer from a slab to be rolled and cooling water to a work roll surface. In order to prevent the chipping and fatigue cracks of a roll surface layer, it is effective to improve the resistance to hot rolling fatigue of a roll surface layer material and increase the compression 0.2% proof strength.

The inventors have conducted studies on various factors that affect the resistance to hot rolling fatigue of a roll surface layer material and the compression 0.2% proof strength. As a result, it has been newly found that the resistance to hot rolling fatigue is considerably improved and the compression 0.2% proof strength is also increased by adjusting the contents of Mo and V in particular ranges, adjusting the amount of a carbide in a particular range, and adding trace amounts of Al and/or rare earth metals (REM).

First, experimental results that provide the base of the present invention will be described. A molten metal having a composition containing, on a mass % basis, C: 2.1% to 3.1%, Si: 0.3% to 0.7%, Mn: 0.3% to 1.0%, Nb: 0.7% to 1.4%, and Co: 0% to 3.1%, further containing Cr in a range of 4.8% to 9.8%, Mo in a range of 3.8% to 6.9%, and V in a range of 4.9% to 7.3%, and further containing 0% to 0.018% Al and 0% to 0.023% REM with the balance being Fe and incidental impurities was melted in a high frequency furnace, and a ring-shaped roll member (outer diameter: 250 mmϕ and wall thickness: 55 mm) corresponding to the roll surface layer material was cast by a centrifugal casting method. The pouring temperature was 1380° C. to 1450° C. and the centrifugal force, expressed as multiples of gravity, was 176 G. After the casting, a quenching treatment and a tempering treatment were performed to adjust the hardness to be 78 to 86 HS. The quenching treatment was a treatment in which the temperature was increased to a heating temperature of 1050° C. and air cooling or furnace cooling was performed. The tempering treatment was a treatment in which the temperature was increased to a tempering temperature of 540° C. to 560° C.

A member (ring-shaped roll member) corresponding to a high-speed steel roll surface layer material made by centrifugal casting and used for a hot finish rolling mill (2.1 mass % C-0.4 mass % Si-0.4 mass % Mn-6.3 mass % Cr-4.2 mass % Mo-5.1 mass % V-0.1 mass % Nb-balance being Fe and incidental impurities) was subjected to centrifugal casting and a heat treatment in the same manner. The obtained ring-shaped roll member was treated as a reference member (Conventional Example).

A fatigue test specimen (outer diameter: 60 mmϕ, wall thickness: 10 mm) was taken from the obtained ring-shaped roll member, and a hot rolling fatigue test was conducted. In the fatigue test specimen, a notch (depth t: 1.2 mm, length L in a circumferential direction: 0.8 mm) shown in FIG. 2 was formed at two positions (positions 180° apart from each other) of a peripheral surface of the specimen by an electro-discharge (wire cut) method that uses a wire with 0.20 mmϕ. The edges of a rolling surface of the fatigue test specimen were chamfered (1.2 C).

As shown in FIG. 1, the hot rolling fatigue test was conducted by a two-disc slipping/rolling method that uses a test specimen and an opposing specimen. The test specimen (fatigue test specimen) including the notches shown in FIG. 2 was rotated at 700 rpm while being cooled with water. An opposing specimen (material: S45C, outer diameter: 190 mmϕ, width 15 mm, chamfered) heated to 790° C. was brought into contact with the rotating test specimen while applying pressure at a load of 980 N and the rolling motion was performed at a slip factor of 10%. The rolling motion was performed until the two notches formed in the fatigue test specimen were broken. The number of rotations of rolling motion until each notch was broken was determined, and the average of the numbers of rotations of rolling motion was defined as the number of rotations of rolling motion leading breakage.

The number of rotations of rolling motion leading breakage in Conventional Example was assumed to be 1.0 (reference), and the ratio of the number of rotations of rolling motion leading breakage of each ring-shaped roll member to the reference, that is, (the number of rotations of rolling motion leading breakage of a ring-shaped roll member)/(the number of rotations of rolling motion in Conventional Example) was calculated. When the ratio was more than 1.5, the ring-shaped roll member was evaluated to have excellent fatigue resistance. As described in Japanese Unexamined Patent Application Publication No. 2010-101752 by the inventors of the present invention, the formation and growth of the surface deterioration and fatigue cracks caused in a hot rolling mill roll can be reproduced by performing the hot rolling fatigue test. Furthermore, the fatigue resistance of a hot rolling mill roll can be easily evaluated and the inventors have confirmed that, a roll surface layer material having a large number of rotations of rolling motion leading breakage in this hot rolling fatigue test is a roll surface layer material having excellent fatigue resistance.

FIG. 3 shows the obtained results in terms of the relationship between the ratio of the number of rotations of rolling motion leading breakage and the amount of (Mo+1.7V) (mass %). FIG. 3 shows the case where the roll surface layer material contains, on a mass % basis, C: 2.1% to 3.1%, Si: 0.3% to 0.7%, Mn: 0.3% to 1.0%, Nb: 0.7% to 1.4%, and Co: 0% to 3.1%, further contains Cr in a range of 4.8% to 9.8%, Mo in a range of 3.8% to 6.9%, and V in a range of 4.9% to 7.3%, and contains Al and/or REM and the case where the roll surface layer material contains, on a mass % basis, C: 2.1% to 3.1%, Si: 0.3% to 0.7%, Mn: 0.3% to 1.0%, Nb: 0.7% to 1.4%, and Co: 0% to 3.1%, further contains Cr in a range of 4.8% to 9.8%, Mo in a range of 3.8% to 6.9%, and V in a range of 4.9% to 7.3%, and does not contain Al or REM. FIG. 3 also shows the case where the roll surface layer material does not contain Co in a separated manner.

As is clear from FIG. 3, when (Mo+1.7V) is in the range of 14.0 to 17.0 and Al and/or REM is contained (●), the ratio of the number of rotations of rolling motion leading breakage is 1.5 or more, which is higher than the ratio of the number of rotations of rolling motion leading breakage in Conventional Example (Δ), and thus the resistance to hot rolling fatigue is considerably improved. On the other hand, when (Mo+1.7V) is in the range of 14.0 to 17.0 but Al or REM is not contained (x), a significant increase in the ratio of the number of rotations of rolling motion leading breakage is not observed.

The present invention has been completed on the basis of the above findings with further studies. That is, the gist of the present invention includes the following.

(1) A roll surface layer material produced by centrifugal casting for a hot rolling mill has excellent fatigue resistance and is used for a centrifugal cast roll for a hot rolling mill, the roll surface layer material having a composition including, on a mass % basis, C: 2.3% to 2.9%, Si: 0.2% to 0.8%, Mn: 0.2% to 1.0%, Cr: 5.0% to 7.5%, Mo: 4.4% to 6.5%, V: 5.3% to 7.0%, Nb: 0.6% to 1.5%, and Co: 0.1% to 4.0% so as to satisfy formula (1) below, $$14.0 \leq (Mo+1.7V) \leq 17.0 \quad (1)$$

(where Mo represents a content (mass %) of Mo and V represents a content (mass %) of V); and further including Al: 0.001% to 0.03% and/or REM: 0.001% to 0.03%, with the balance being Fe and incidental impurities.

(2) In (1), a centrifugal cast roll for a hot rolling mill has excellent fatigue resistance and includes a surface layer and an internal layer integrally welded to the surface layer, the surface layer having a composition including, on a mass % basis, C: 2.3% to 2.9%, Si: 0.2% to 0.8%, Mn: 0.2% to 1.0%, Cr: 5.0% to 7.5%, Mo: 4.4% to 6.5%, V: 5.3% to 7.0%, Nb: 0.6% to 1.5%, and Co: 0.1% to 4.0% so as to satisfy formula (1) below, $$14.0 \leq (Mo+1.7V) \leq 17.0 \quad (1)$$

(where Mo represents a content (mass %) of Mo and V represents a content (mass %) of V); and further including Al: 0.001% to 0.03% and/or REM: 0.001% to 0.03%, with the balance being Fe and incidental impurities.

According to the present invention, a roll surface layer material having both high compression 0.2% proof strength and excellent resistance to hot rolling fatigue can be provided and a high-performance centrifugal cast roll for a hot rolling mill with considerably improved fatigue resistance can be easily produced at low cost, which achieves significant industrial advantages. In the centrifugal cast roll for a hot rolling mill according to the present invention, the fatigue resistance can be considerably improved and the damage to a roll surface such as wear, surface deterioration, surface chipping, or fatigue cracks can be considerably suppressed even in a severe hot rolling environment in which a high rolling load is applied. According to the present invention, a significant improvement in the surface quality of hot rolled steel sheets, an improvement in the productivity of hot rolled steel sheets, and an improvement in the life of rolls can be achieved all together.

DETAILED DESCRIPTION OF EMBODIMENTS OF THE INVENTION

Figure 1:
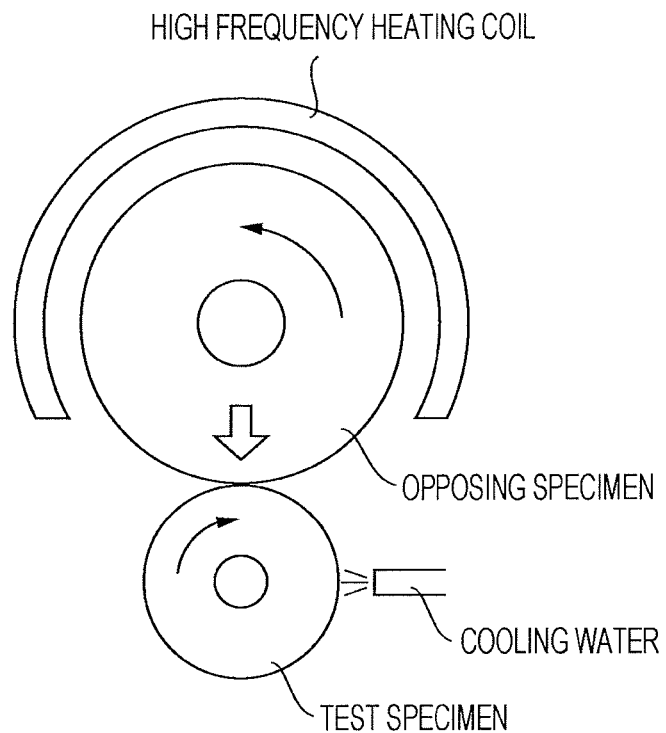
FIG. 1 is an explanatory view schematically showing a structure of a tester used in a hot rolling fatigue test.

A roll surface layer material of the present invention is made by centrifugal casting and can be directly used for ring rolls and sleeve rolls. The roll surface layer material is applied as a surface layer material of hot rolling mill composite roll suitable for hot finish rolling. The hot rolling mill composite roll of an embodiment of the present invention includes a surface layer made by centrifugal casting and an internal layer that is integrally welded to the surface layer. An intermediate layer may be disposed between the surface layer and the internal layer. In other words, the hot rolling mill composite roll may include, instead of the internal layer integrally welded to the surface layer, an intermediate layer integrally welded to the surface layer and an internal layer integrally welded to the intermediate layer. The internal layer is preferably made by a static casting method. In the present invention, the compositions of the internal layer and intermediate layer are not particularly limited, but the internal layer is preferably composed of spherical graphitic cast iron and the intermediate layer is composed of a high carbon material containing C: 1.5 to 3 mass %.

The reasons for limiting the composition of the roll surface layer material (surface layer) will be described. Hereinafter, mass % is simply expressed as % unless otherwise specified.

C: 2.3% to 2.9%

C dissolves into a matrix and thus increases the hardness of the matrix and also bonds to a carbide-forming element and thus forms a hard carbide, thereby improving the wear resistance of the roll surface layer material. The amount of an eutectic carbide varies depending on the C content. The eutectic carbide affects the rolling characteristics. Therefore, at a C content of less than 2.3%, an insufficiently small amount of the eutectic carbide increases the friction force during rolling and causes unstable rolling, and also the compression 0.2% proof strength of the roll surface layer material decreases. On the other hand, at a C content exceeding 2.9%, the amount of the eutectic carbide excessively increases, the roll surface layer member becomes hard and brittle, the formation and growth of fatigue cracks are facilitated, and the fatigue resistance degrades. Accordingly, the C content is limited to the range of 2.3% to 2.9%.

Si: 0.2% to 0.8%

Si is an element that serves as a deoxidizer agent and that improves the castability of molten metal. To achieve such effects, 0.2% or more of Si needs to be contained. On the other hand, at a Si content exceeding 0.8%, the effects are saturated and effects corresponding to the content are not to be expected, which is economically disadvantageous. Accordingly, the Si content is limited to 0.2% to 0.8%.

Mn: 0.2% to 1.0%

Mn is an element that fixes S in the form of MnS, thereby rendering S harmless and that partly dissolves into a matrix, thereby improving the hardenability. To achieve such effects, 0.2% or more of Mn needs to be contained. At a Mn content exceeding 1.0%, the effects are saturated and effects corresponding to the content are not to be expected, and furthermore the material may become brittle. Accordingly, the Mn content is limited to 0.2% to 1.0%.

Cr: 5.0% to 7.5%

Cr is an element that bonds to C and mainly forms an eutectic carbide, thereby improving the wear resistance and that decreases the friction force with a steel sheet during rolling and thus reduces the damage to a roll surface, thereby stabilizing the rolling. To achieve such effects, 5.0% or more of Cr needs to be contained. At a Cr content exceeding 7.5%, the amount of a hard and brittle eutectic carbide excessively increases, which degrades the fatigue resistance. Accordingly, the Cr content is limited to the range of 5.0% to 7.5%.

Mo: 4.4% to 6.5%

Mo is an element that bonds to C and forms a hard carbide, thereby improving the wear resistance. Mo is also an element that dissolves into a hard MC carbide in which V and Nb bond to C, thereby reinforcing the carbide and that also dissolves into an eutectic carbide, thereby increasing the fracture resistance of the carbides. Through such actions, Mo improves the wear resistance and fatigue resistance of the roll surface layer member. To achieve such effects, 4.4% or more of Mo needs to be contained. At a Mo content exceeding 6.5%, a hard and brittle carbide mainly composed of Mo is formed. This degrades the resistance to hot rolling fatigue, which degrades the fatigue resistance. Accordingly, the Mo content is limited to the range of 4.4% to 6.5%.

V: 5.3% to 7.0%

V is an advantageous element in the present invention because V imparts both wear resistance and fatigue resistance required for a roll. V forms an extremely hard carbide (MC carbide) and thus improves the wear resistance and also effectively divides and disperses/crystallizes an eutectic carbide. V is also an element that improves the resistance to hot rolling fatigue, thereby considerably improving the fatigue resistance of the roll surface layer material. Such effects are significantly achieved at a V content of 5.3% or more. However, at a V content exceeding 7.0%, a coarse MC carbide is formed and the centrifugal casting segregation of the MC carbide is facilitated, which destabilizes various characteristics of a rolling mill roll. Accordingly, the V content is limited to the range of 5.3% to 7.0%.

Nb: 0.6% to 1.5%

Nb dissolves into an MC carbide and reinforces the MC carbide and thus increases the fracture resistance of the MC carbide, thereby further improving the wear resistance, in particular, the fatigue resistance. When both Nb and Mo are dissolved into a carbide, the wear resistance and the fatigue resistance are considerably improved. Nb is also an element that facilitates the division of an eutectic carbide and suppresses the fracture of the eutectic carbide, thereby improving the fatigue resistance of the roll surface layer material. Nb also suppresses the segregation of the MC carbide during centrifugal casting. Such effects are significantly achieved at a Nb content of 0.6% or more. However, at a Nb content exceeding 1.5%, the growth of the MC carbide in a molten metal is facilitated and the carbide segregation during centrifugal casting is promoted. Accordingly, the Nb content is limited to the range of 0.6% to 1.5%.

Co: 0.1% to 4.0%

Co is an element that dissolves into a matrix and reinforces the matrix, in particular, at high temperature, thereby improving the fatigue resistance. To achieve such effects, 0.1% or more of Co needs to be contained. On the other hand, at a Co content exceeding 4.0%, the effects are saturated and effects corresponding to the content are not to be expected, which is economically disadvantageous. Accordingly, the Co content is limited to the range of 0.1% to 4.0%. The Co content is preferably 0.2% to 3.0%.

In the present invention, Mo and V are preferably contained in the above-described ranges and furthermore are preferably contained so as to satisfy formula (1) below.

$$14.0 \leq (Mo+1.7V) \leq 17.0 \quad (1)$$

(where Mo represents a content (mass %) of Mo and V represents a content (mass %) of V)

Figure 3:
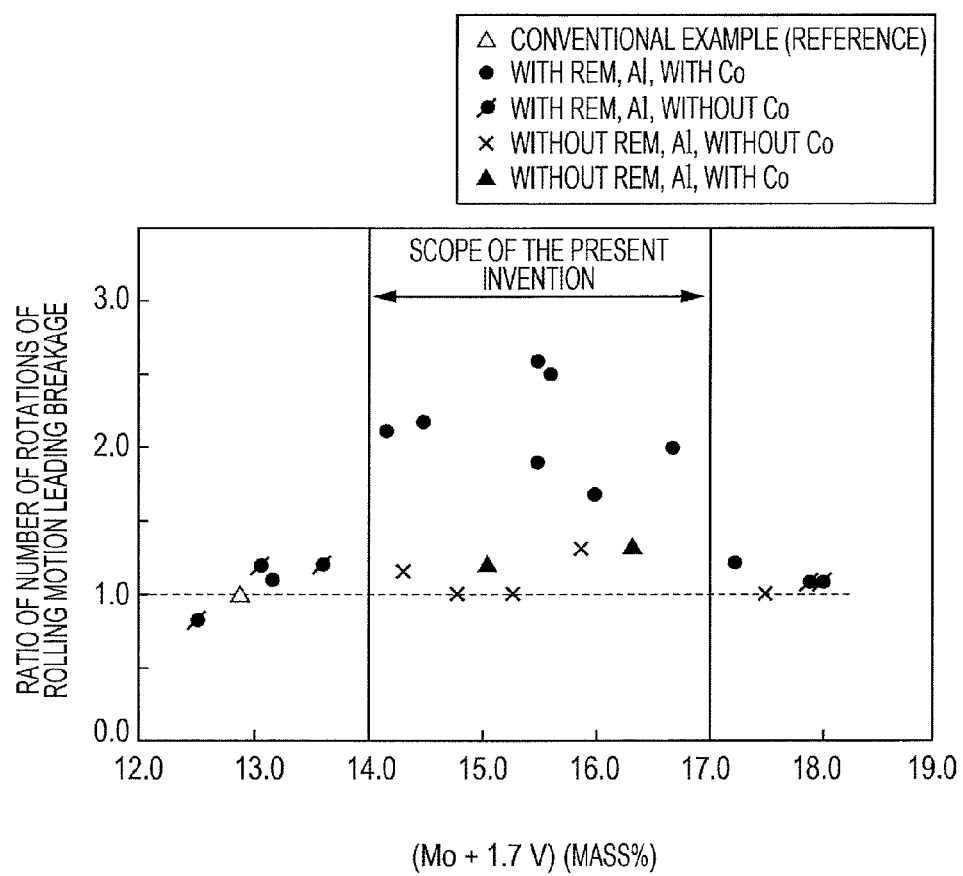
FIG. 3 is a graph showing the influence of REM and/or Al on the relationship between the ratio of the number of rotations of rolling motion leading breakage and the (Mo+1.7V) amount in the hot rolling fatigue test.

As shown in FIG. 3, when Al and/or REM is contained, by adding Mo and V so that (Mo+1.7V) satisfies the above formula (1), the number of rotations of rolling motion leading breakage is considerably increased compared with the reference (Conventional Example) and thus the resistance to hot rolling fatigue is considerably improved. The (Mo+1.7V) is an important factor for improving the resistance to hot rolling fatigue. Only when the (Mo+1.7V) is adjusted to be in the range of 14.0 to 17.0, excellent resistance to hot rolling fatigue can be maintained. In the case where the (Mo+1.7V) is outside the range of 14.0 to 17.0, even if Al and/or REM is contained, the resistance to hot rolling fatigue degrades. Accordingly, in the present invention, the contents of Mo and V can be adjusted so as to satisfy the formula (1).

In the present invention, the contents of Mo and V can be adjusted so as to satisfy the formula (1) and Al and/or REM is essentially contained.

Al: 0.001% to 0.03% and/or REM: 0.001% to 0.03%

Only when Mo and V are contained so as to satisfy the formula (1), Al and/or REM considerably improves the resistance to hot rolling fatigue as shown in FIG. 3. To achieve such effects, 0.001% or more of each of Al and REM needs to be contained. On the other hand, even if more than 0.03% of each of Al and REM is contained, the effects are saturated and the castability is degraded by, for example, bubble formation and a decrease in fluidity of molten steel. Accordingly, the contents of Al and/or REM are limited to the range of Al: 0.001% to 0.03% and/or REM: 0.001% to 0.03%.

The balance other than the above components is Fe and incidental impurities.

Examples of the incidental impurities include P: 0.05% or less, S: 0.05% or less, and N: 0.06% or less. P segregates in a grain boundary and degrades the quality of a material. Therefore, in the present invention, the P content is desirably as low as possible, but a P content of 0.05% or less is permissible. S is present in the form of a sulfide inclusion and degrades the quality of a material. Therefore, the S content is preferably as low as possible, but a S content of 0.05% or less is permissible. N mixes in a concentration of about 0.06% or less through ordinary dissolution, but such a concentration does not affect the advantageous effects of the present invention. The N content is preferably less than 0.05% because N may form defects at a boundary between the surface layer and the intermediate layer or between the surface layer and the internal layer of a composite roll.

In the roll surface layer material of the present invention, large amounts of Cr, V, Mo, and the like are contained and an extremely hard carbide (MC carbide) and an eutectic carbide are dispersed, whereby a desired hardness, a desired wear resistance, and the like are achieved. If the carbides have an area fraction of less than 13%, such a desired hardness, wear resistance, and the like are not easily achieved. On the other hand, if the carbides have an area fraction of more than 20%, the roll material may become brittle. Accordingly, the area fraction of the carbides is preferably limited to the range of 13% to 20%.

A preferred method for producing a hot rolling mill composite roll of the present invention will now be described.

In the present invention, the method for producing a roll surface layer member is a centrifugal casting method, which is performed with a low energy cost.

A molten metal having the above roll surface layer material composition is poured into a rotatable mold whose internal surface is coated with a refractory mainly composed of zircon so that a predetermined wall thickness is achieved. The molten metal is then subjected to centrifugal casting. In the case where an intermediate layer is formed, the intermediate layer is preferably formed by the following method. During the solidification of the roll surface layer member or after the complete solidification of the roll surface layer member, a molten metal having an intermediate layer composition is poured into the mold while rotating the mold and then cast by centrifugal casting. After the surface layer or the intermediate layer is completely solidified, preferably, the rotation of the mold is stopped and the mold is put in a standing position, and then an internal layer material is cast by static casting to obtain a composite roll. Thus, the inner surface of the roll surface layer member is remelted to form a composite roll in which the surface layer and the internal layer are integrally welded or a composite roll in which the surface layer and the intermediate layer are integrally welded and the intermediate layer and the internal layer are integrally welded.

The internal layer subjected to static casting is preferably composed of, for example, spherical graphitic cast iron or compacted vermicular graphitic cast iron (CV cast iron) having excellent castability and mechanical properties. Since the centrifugal cast roll includes the surface layer and the internal layer integrally welded to each other, about 1% to 8% of surface layer components mix in the internal layer. Cr, V, and the like contained in the surface layer member are powerful carbide-forming elements. The mixing of these elements in the internal layer causes the internal layer to be brittle. Accordingly, the proportion of the surface layer components mixed in the internal layer is preferably decreased to less than 6%.

In the case where the intermediate layer is formed, for example, graphitic steel, high carbon steel, or hypoeutectic cast iron is preferably used for the intermediate layer material. The intermediate layer and the surface layer are integrally welded in a similar manner, and about 10% or more and 90% or less of the surface layer components mix in the intermediate layer. To suppress the amount of the surface layer components mixed in the internal layer, it is important to reduce the amount of the surface layer components mixed in the intermediate layer as much as possible.

The hot rolling mill composite roll of the present invention is preferably heat treated after the casting. The heat treatment preferably includes performing a process in which the composite roll is heated to 950° C. to 1150° C. and cooled by air cooling or air blast cooling and performing, at least once, a process in which the composite roll is heated and held at 450° C. to 600° C. and then cooled.

The hardness of the hot rolling mill composite roll of the present invention is preferably 79 to 88 HS and more preferably 80 to 86 HS. To stably achieve the hardness, it is recommended to adjust the heat treatment after the casting.

EXAMPLES

A molten metal having a roll surface layer material composition shown in Table 1 was melted in a high frequency furnace and cast into a ring-shaped test member (ring roll; outer diameter: 250 mm$\phi$, wall thickness: 55 mm) by a centrifugal casting method. The pouring temperature was 1380° C. to 1450° C. and the centrifugal force, expressed as multiples of gravity, was 176 G. After the casting, a quenching treatment in which the ring-shaped test member was reheated to a quenching temperature of 1050° C. and cooled by air cooling and a tempering treatment in which the ring-shaped test member was heated and held at a tempering temperature of 450° C. to 600° C. and cooled were performed to adjust the hardness to be 78 to 84 HS.

A ring-shaped test member (ring roll) having a composition of a high-speed steel roll surface layer member made by centrifugal casting and used for a hot finish rolling mill (on a mass % basis, 2.1% C-0.4% Si-0.4% Mn-6.3% Cr-4.2% Mo-5.1% V-0.1% Nb-balance being Fe and incidental impurities) was cast by a centrifugal casting method and heat treated in the same manner to obtain a reference member (Conventional Example).

A hardness test specimen, a compression test specimen, a hot rolling fatigue test specimen, and a test specimen for microstructure observation were taken from the obtained ring-shaped test member to perform a hardness test, a compression test, a hot rolling fatigue test, and a microstructure observation test. The test methods are as follows.

(1) Hardness Test

The Vickers hardness HV 50 of the prepared hardness test specimen was measured with a Vickers hardness tester (testing force: 50 kgf (490 kN)) in conformity with JIS Z 2244, and the Vickers hardness HV 50 was converted into Shore hardness HS using a JIS conversion table. The Vickers hardness HV 50 was measured at 10 positions for each specimen. The maximum value and the minimum value were taken away and the arithmetic mean was calculated. The arithmetic mean was defined as the hardness of the test member.

(2) Compression Test

A compression test was performed on the prepared compression test specimen (diameter 10 mm$\phi$×length 20 mm) at room temperature. The number of repetitions was set to be two. In the compression test, a strain gage was attached to the central portion of the compression test specimen and a stress-strain curve was obtained. The 0.2% proof strength was read from the obtained stress-strain curve. The average of 0.2% proof strengths of two test specimens was defined as the 0.2% proof strength of each test member.

(3) Hot Rolling Fatigue Test

Figure 2:
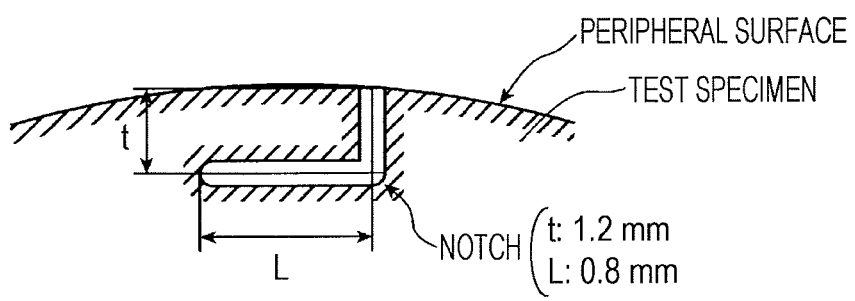
FIG. 2 is an explanatory view schematically showing the shape and size of a notch formed in a peripheral surface of a test specimen for a hot rolling fatigue test (fatigue test specimen) used in Examples.

A hot rolling fatigue test specimen (outer diameter: 60 mm$\phi$, wall thickness: 10 mm, chamfered) having a shape shown in FIG. 2 was taken from the obtained ring-shaped test member. In the hot rolling fatigue test specimen, a notch (depth t: 1.2 mm, length L in a circumferential direction: 0.8 mm) shown in FIG. 2 was formed at two positions (positions 180° apart from each other) of a peripheral surface of the specimen by an electro-discharge (wire cut) method that uses a wire with 0.20 mm$\phi$. As shown in FIG. 1, the hot rolling fatigue test was conducted by a two-disc slipping/rolling method that uses a test specimen and an opposing specimen. The test specimen was rotated at 700 rpm while being cooled with water. An opposing specimen (material: S45C, outer diameter: 190 mm$\phi$, width 15 mm, chamfered) heated to 790° C. was brought into contact with the rotating test specimen while applying pressure at a load of 980 N and the rolling motion was performed at a slip factor of 10%. The rolling motion was performed until the two notches formed in the hot rolling fatigue test specimen were broken. The number of rotations of rolling motion until each notch was broken was determined, and the average of the numbers of rotations of rolling motion was defined as the number of rotations of rolling motion leading breakage. The number of rotations of rolling motion leading breakage in Conventional Example was assumed to be a reference (1.0), and the ratio of the number of rotations of rolling motion leading breakage of each ring-shaped test member to the number of rotations of rolling motion leading breakage in Conventional Example, that is, (the number of rotations of rolling motion leading breakage of each ring-shaped test member)/(the number of rotations of rolling motion in Conventional Example) was calculated and used as an index of fatigue resistance. When the ratio of the numbers of rotations of rolling motion leading breakage was more than 1.5, the ring-shaped test member was evaluated to have excellent fatigue resistance.

(4) Microstructure Observation Test

The prepared test specimen for microstructure observation was polished and subjected to nital corrosion. The microstructure was observed using an image analyzer with an optical microscope at a magnification of 50 times. The obtained image was subjected to binary conversion to measure the area fraction of a carbide. The area fraction was treated as the amount of a carbide of each test member. Table 2 shows the results.

TABLE 1

| Test member No. | Chemical composition (mass %) | | | | | | | | | | | | Mo + 1.7V | Satisfaction of formula (1)* | Remarks |
|---|---|---|---|---|---|---|---|---|---|---|---|---|---|---|---|
| | C | Si | Mn | P | S | Cr | Mo | V | Nb | Co | REM | Al | | | |
| A | 2.5 | 0.5 | 0.4 | 0.02 | 0.008 | 6.2 | 5.3 | 6 | 0.9 | 2.1 | 0.023 | 0.015 | 15.5 | Yes | Invention Example |
| B | 2.6 | 0.3 | 0.5 | 0.025 | 0.009 | 6.3 | 6.3 | 5.7 | 1.1 | 0.3 | — | 0.012 | 16 | Yes | Invention Example |
| C | 2.5 | 0.4 | 0.4 | 0.028 | 0.01 | 7.5 | 5.1 | 5.5 | 1.3 | 3.1 | 0.01 | — | 14.5 | Yes | Invention Example |
| D | 2.7 | 0.4 | 0.3 | 0.015 | 0.008 | 7.1 | 4.6 | 6.4 | 1 | 0.9 | — | 0.013 | 15.5 | Yes | Invention Example |
| E | 2.7 | 0.6 | 0.5 | 0.022 | 0.007 | 7 | 5.4 | 6 | 1.2 | 1.3 | 0.007 | 0.006 | 15.6 | Yes | Invention Example |
| F | 2.4 | 0.7 | 1 | 0.03 | 0.01 | 6.7 | 4.5 | 5.7 | 1.4 | 2 | 0.006 | 0.015 | 14.2 | Yes | Invention Example |
| G | 2.8 | 0.4 | 0.8 | 0.019 | 0.009 | 5.1 | 5.6 | 6.5 | 0.8 | 0.4 | 0.004 | 0.018 | 16.7 | Yes | Invention Example |
| H | 2.3 | 0.4 | 0.5 | 0.018 | 0.01 | 7.2 | 4.8 | 4.9 | 1.2 | — | — | 0.005 | 13.1 | No | Comparative Example |
| I | 2.1 | 0.3 | 0.4 | 0.019 | 0.008 | 6 | 6.1 | 6.9 | 1.2 | — | 0.021 | — | 17.9 | No | Comparative Example |
| J | 2.6 | 0.4 | 0.4 | 0.019 | 0.009 | 7.9 | 4.1 | 5.6 | 1.1 | — | — | 0.01 | 13.6 | No | Comparative Example |
| K | 3.1 | 0.4 | 0.4 | 0.024 | 0.009 | 7.3 | 5.6 | 7.3 | 1.1 | — | 0.004 | 0.006 | 18 | No | Comparative Example |
| L | 2.9 | 0.5 | 0.9 | 0.022 | 0.008 | 7.4 | 5.6 | 5.4 | 0.7 | — | — | 0.0004 | 14.8 | Yes | Comparative Example |
| M | 2.8 | 0.4 | 0.4 | 0.017 | 0.008 | 6.8 | 5.5 | 6.1 | 1 | — | — | — | 15.9 | Yes | Comparative Example |
| N | 2.6 | 0.6 | 0.6 | 0.021 | 0.009 | 6.5 | 4.8 | 5.6 | 1.1 | — | — | — | 14.3 | Yes | Comparative Example |
| O | 2.7 | 0.4 | 0.5 | 0.023 | 0.008 | 6.9 | 5.5 | 5.8 | 1.1 | — | — | — | 15.3 | Yes | Comparative Example |
| P | 2.1 | 0.4 | 0.4 | 0.026 | 0.011 | 6.3 | 4.2 | 5.1 | 0.1 | — | — | — | 12.9 | No | Conventional Example |
| Q | 2.7 | 0.3 | 0.3 | 0.021 | 0.009 | 9.8 | 6 | 5 | 1.3 | — | — | — | 14.5 | Yes | Comparative Example |
| R | 2.6 | 0.4 | 0.3 | 0.019 | 0.01 | 4.8 | 3.8 | 5.1 | 1 | — | — | 0.011 | 12.5 | No | Comparative Example |
| S | 2.7 | 0.3 | 0.3 | 0.018 | 0.008 | 7 | 6.9 | 6.2 | 1 | — | — | — | 17.5 | No | Comparative Example |
| T | 2.5 | 0.5 | 0.6 | 0.018 | 0.008 | 7.1 | 6 | 5.4 | 1 | 1.5 | — | — | 15.2 | Yes | Comparative Example |
| U | 2.7 | 0.4 | 0.5 | 0.025 | 0.01 | 7.3 | 5.7 | 6.4 | 1.1 | 2 | — | — | 16.6 | Yes | Comparative Example |
| V | 2.6 | 0.6 | 0.4 | 0.028 | 0.008 | 7 | 4 | 5.5 | 1.2 | 1 | 0.007 | 0.015 | 13.4 | No | Comparative Example |
| W | 2.5 | 0.5 | 0.5 | 0.018 | 0.006 | 6.9 | 6.9 | 6.2 | 0.9 | 1.5 | 0.009 | 0.018 | 17.4 | No | Comparative Example |

Satisfaction of formula (1)* 14.0 ≤ (Mo + 1.7V) ≤ 17.0
Underlined items are outside the scope of the present invention.

TABLE 2

| Test member No. | Amount of carbide Area fraction (%) | Hardness HS | Strength 0.2% proof strength (MPa) | Fatigue resistance Ratio of number of rotations of rolling motion leading breakage | Remarks |
|---|---|---|---|---|---|
| A | 17.6 | 82 | 2215 | 2.6 | Invention Example |
| B | 15.8 | 85 | 2263 | 1.7 | Invention Example |
| C | 19 | 83 | 2145 | 2.2 | Invention Example |
| D | 18.3 | 81 | 2140 | 1.9 | Invention Example |
| E | 16.5 | 84 | 2190 | 2.5 | Invention Example |
| F | 14.9 | 80 | 2110 | 2.1 | Invention Example |
| G | 17 | 83 | 2142 | 2 | Invention Example |
| H | 18.3 | 83 | 1916 | 1.2 | Comparative Example |
| I | 11.2 | 82 | 1713 | 1.1 | Comparative Example |
| J | 17.5 | 84 | 1983 | 1.2 | Comparative Example |
| K | 22.7 | 84 | 1867 | 1.1 | Comparative Example |
| L | 24.2 | 82 | 1867 | 1 | Comparative Example |
| M | 16.7 | 83 | 1923 | 1.3 | Comparative Example |
| N | 15.9 | 84 | 1996 | 1.2 | Comparative Example |
| O | 16.9 | 84 | 1196 | 1 | Comparative Example |
| P | 8.2 | 81 | 1823 | 1.0 (reference) | Conventional Example |
| Q | 23.5 | 82 | 1910 | 1.2 | Comparative Example |
| R | 13.6 | 82 | 1891 | 0.8 | Comparative Example |
| S | 18.7 | 84 | 1872 | 1 | Comparative Example |
| T | 16.8 | 81 | 1885 | 1.2 | Comparative Example |
| U | 17.1 | 80 | 1925 | 1.3 | Comparative Example |
| V | 18 | 83 | 1954 | 1.1 | Comparative Example |
| W | 16.4 | 82 | 1863 | 1.2 | Comparative Example |

Underlined items are outside the scope of the present invention.

In Invention Examples, the number of rotations of rolling motion leading breakage was increased to more than 1.5 times the number of rotations of rolling motion leading breakage in Conventional Example (reference) and the resistance to hot rolling fatigue was considerably improved. Furthermore, the compression 0.2% proof strength was as high as 2000 MPa or more. Therefore, in Invention Examples, roll surface layer materials having excellent fatigue resistance and having both high compression 0.2% proof strength and excellent resistance to hot rolling fatigue were provided. In Comparative Examples which are outside the scope of the present invention, the compression 0.2% proof strength was degraded, the resistance to hot rolling fatigue was degraded, or both of them were degraded.

The invention claimed is:
1. A roll surface layer material produced by centrifugal casting for a hot rolling mill, the roll surface layer material having excellent fatigue resistance and a compression 0.2% proof strength of 2000 MPa or more, and being used for a centrifugal cast roll for a hot rolling mill composite roll having a hardness of 79 to 88 HS, a composition of the roll surface layer material consisting of, on a mass % basis:

Carbon (C): 2.3% to 2.9%;
Silicon (Si): 0.2% to 0.8%;
Manganese (Mn): 0.2% to 1.0%;
Chromium (Cr): 5.0% to 7.5%;
Molybdenum (Mo): 4.4% to 6.5%;
Vanadium (V): 5.3% to 7.0%;
Niobium (Nb): 0.6% to 1.5%;
Cobalt (Co): 0.1% to 4.0%, and
at least one of aluminum (Al) or rare earth metals (REM) in an amount of 0.001% to 0.03%,
so as to satisfy formula (1) below, with the balance being iron (Fe) and incidental impurities including phosphor (P): 0.05% or less, sulfur (S): 0.05% or less and nitrogen (N): 0.06% or less,
and wherein an area fraction of carbides in the roll surface layer material is in the range of 13% to 20%, $$14.0 \leq (Mo+1.7V) \leq 17.0 \qquad (1)$$

wherein Mo represents a content (mass%) of molybdenum and V represents a content (mass%) of vanadium.

2. A centrifugal cast roll for a hot rolling mill composite roll having a hardness of 79 to 88 HS, the centrifugal cast roil having excellent fatigue resistance and a compression 0.2% proof strength of 2000 MPa or more, and including a surface layer and an internal layer integrally welded to the surface layer, a composition of the roll surface layer material consisting of, on a mass % basis:

Carbon (C): 2.3% to 2.9%;
Silicon (Si): 0.2% to 0.8%;
Manganese (Mn): 0.2% to 1.0%;
Chromium (Cr): 5.0% to 7.5%;
Molybdenum (Mo): 4.4% to 6.5%;
Vanadium (V): 5.3% to 7.0%;
Niobium (Nb): 0.6% to 1.5%;
Cobalt (Co): 0.1% to 4.0%, and
at least one of aluminum (Al) or rare earth metals (REM) in an amount of 0.001% to 0.03%,
so as to satisfy formula (1) below, with the balance being iron (Fe) and incidental impurities including phosphor (P): 0.05% or less, sulfur (S): 0.05% or less and nitrogen (N): 0.06% or less,
and wherein an area fraction of carbides in the roll surface layer material is in the range of 13% to 20%, $$14.0 \leq (Mo+1.7V) \leq 17.0 \qquad (1)$$

wherein Mo represents a content (mass%) of molybdenum and V represents a content (mass%) of vanadium.

* * * * *